United States Patent [19]

Temple et al.

[11] Patent Number: 4,523,837

[45] Date of Patent: Jun. 18, 1985

[54] DOCUMENT HANDLING SYSTEM TO ENABLE LARGE DOCUMENT COPYING ON A STANDARD OFFICE COPIER

[75] Inventors: Russell A. Temple, Sierra Madre; Martin G. Wesseler, Arcadia; David C. Harper, Claremont; Harry F. Eiland, Cerritos; Robert G. Tellkamp, West Covina, all of Calif.

[73] Assignee: Xerox Corporation, Stamford, Conn.

[21] Appl. No.: 513,935

[22] Filed: Jul. 14, 1983

[51] Int. Cl.³ .................... G03B 27/48; G03B 27/50; G03B 27/70

[52] U.S. Cl. .................. 355/51; 355/3 SH; 355/14 SH; 355/75

[58] Field of Search ............ 355/8, 11, 14 R, 14 SH, 355/3 SH, 51, 57, 75

[56] References Cited

U.S. PATENT DOCUMENTS

| | | | |
|---|---|---|---|
| 4,029,409 | 6/1977 | Spinelli et al. | 355/51 |
| 4,084,897 | 4/1978 | Queener | 355/8 |
| 4,139,298 | 2/1979 | Tani | 355/8 |
| 4,170,412 | 10/1979 | Grace et al. | 355/8 X |
| 4,214,832 | 7/1980 | Kono et al. | 355/51 X |
| 4,318,609 | 3/1982 | Knechtel et al. | 355/11 |
| 4,326,797 | 4/1982 | Miyamoto et al. | 355/57 |
| 4,351,606 | 9/1982 | Franko | 355/14 R |

Primary Examiner—Richard A. Wintercorn
Attorney, Agent, or Firm—Franklyn C. Weiss

[57] ABSTRACT

A movable document handling system, or module, is utilized on a modified standard office copier. When the document handling module is moved away from the platen glass area, the document handling module equipment is disabled and the office copier may be used as a standard copier. When, however, the document handling module is moved over the platen glass, other optics and document handling apparatus are now energized and the standard office copier is now converted into a large document copier. Additional mechanical apparatus moves lenses in a predetermined fashion in the document handling module in order to allow for various levels of magnification for reducing the size of the copy from the large input document.

13 Claims, 12 Drawing Figures

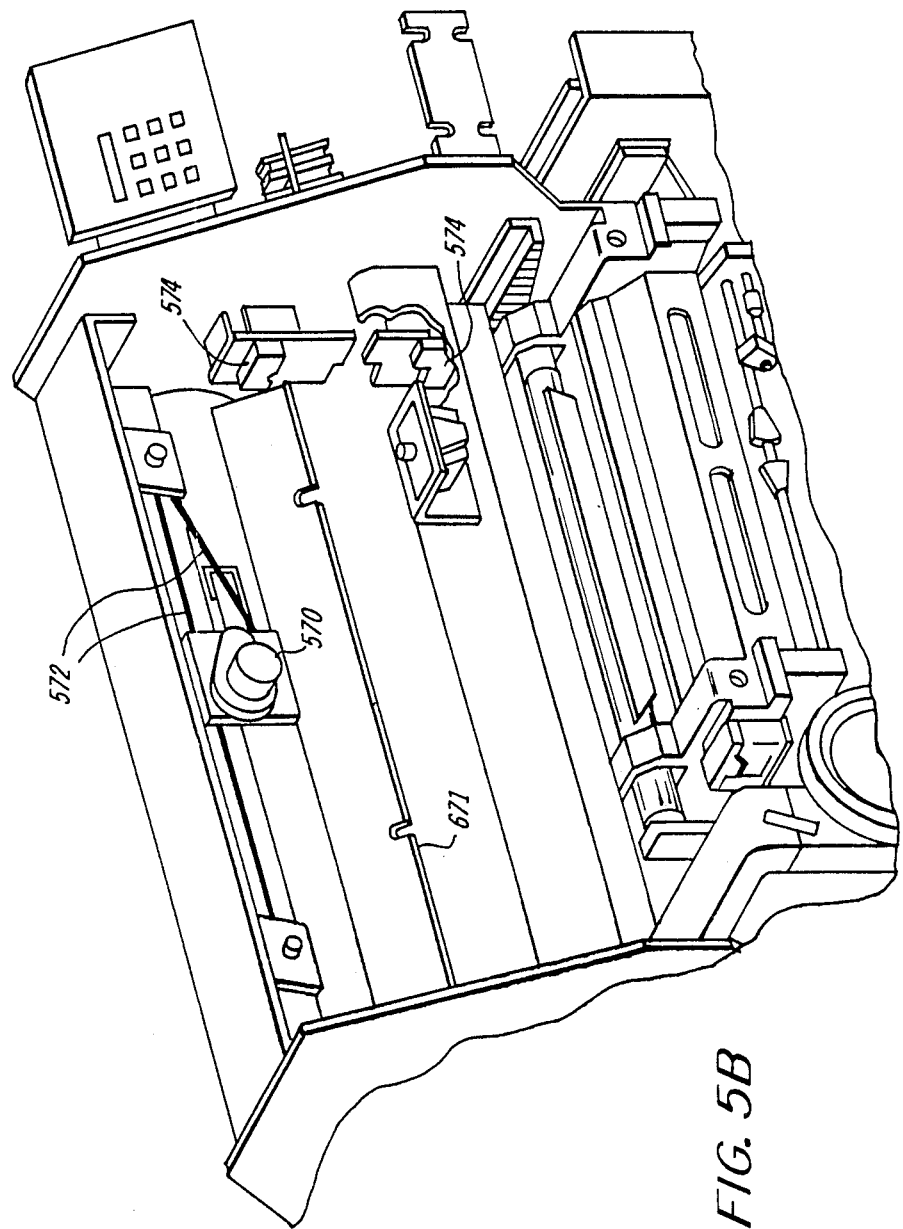

4,523,837

DOCUMENT HANDLING SYSTEM TO ENABLE LARGE DOCUMENT COPYING ON A STANDARD OFFICE COPIER

The invention relates to a document handling system for enabling large document copying on a standard office copier. A movable document handling module on the top of a dual mode office copier allows standard office copying from one side of the machine while allowing standard and large document copying from the other side of the copying machine.

BACKGROUND OF THE INVENTION

Standard office copiers have proliferated throughout the business world for copying original documents onto plain pieces of paper. Many such machines on the market accomplish this task with a number of manufacturing companies supplying such apparatus to the general marketplace.

Previously, however, standard office copiers normally made copies on sheets of paper ranging from $8\frac{1}{2} \times 11$ to $11 \times 14$ inches (or in foreign countries, standard paper known as A4 paper). Other copiers had to be used for copying engineering type drawings because of the fact that extra optics are needed to reduce the large size engineering drawings down to paper, for example, the size of 14 inch by 17 inch paper. Certain customers desire the facility of copying both office type documents and engineering type documents at the same time, to remove the necessity for having two, separate and distinct, copiers.

Xerox Corporation, a large manufacturer of plain paper copiers, has marketed the 3107 model office copier for several years. This copier is a standard office copier which copies those office documents set forth above. Certain 3107 and other Xerox copier customers desire to have a copier which could copy larger sized documents while not necessitating the purchase of a second copier for such large document copying. Thus, it was presented that a movable document handling system placed on top of the 3107 machine, modified to accommodate the extra weight, optical path, etc., could be utilized to allow for standard office copying at one end while allowing for large document copying at the other end.

According to the present invention, a movable document handling system, or module, is utilized on a modified standard office copier. When the document handling module is moved away from the platen glass area, the document handling module equipment is disabled and the office copier may be used as a standard copier. When, however, the document handling module is moved over the platen glass, other optics and document handling apparatus are now energized and the standard office copier is now converted into a large document copier. Additional mechanical apparatus moves lenses in a predetermined fashion in the document handling module in order to allow for various levels of magnification for reducing the size of the copy from the large input document.

DESCRIPTION OF THE DRAWINGS

For a more complete understanding of the invention, reference may be had to the following detailed description of the invention in conjunction with the drawings wherein:

FIGS. 5a and 5b are representative mechanical drawings of the document handling module showing the operation of the fold mirror and reduction mirror therein;

DETAILED DESCRIPTION OF THE INVENTION

In order to assist in the understanding of the following description, several terms are defined in order to interpret the detailed description of the invention correctly.

Document handling module (DHM) refers to the portion of the machine that is used to copy standard and large documents.

Print or print cycle is defined as the complete sequence of events that occur between the initiation of the copying cycle or the paper feeder and the copier's return to stand-by after it times out.

Stand-by is the condition characterized by the fact that various parts of the machine are fully warmed and all stand-by power is available throughout the copier, but the print cycle has not yet been initiated.

The platen mode is the standard copying mode in which the copier operates with the document handler in the platen position, defined as not being over the platen glass.

Document handling mode or DH mode is the mode in which the document handler is positioned over the platen glass, and the document handler is used to transport and illuminate the input document.

Reduction mode is the mode in which the input image is reduced to either 63% or 50% of its original size. The document handler is used, and the reduction lens is in the optical path.

Figure 1:
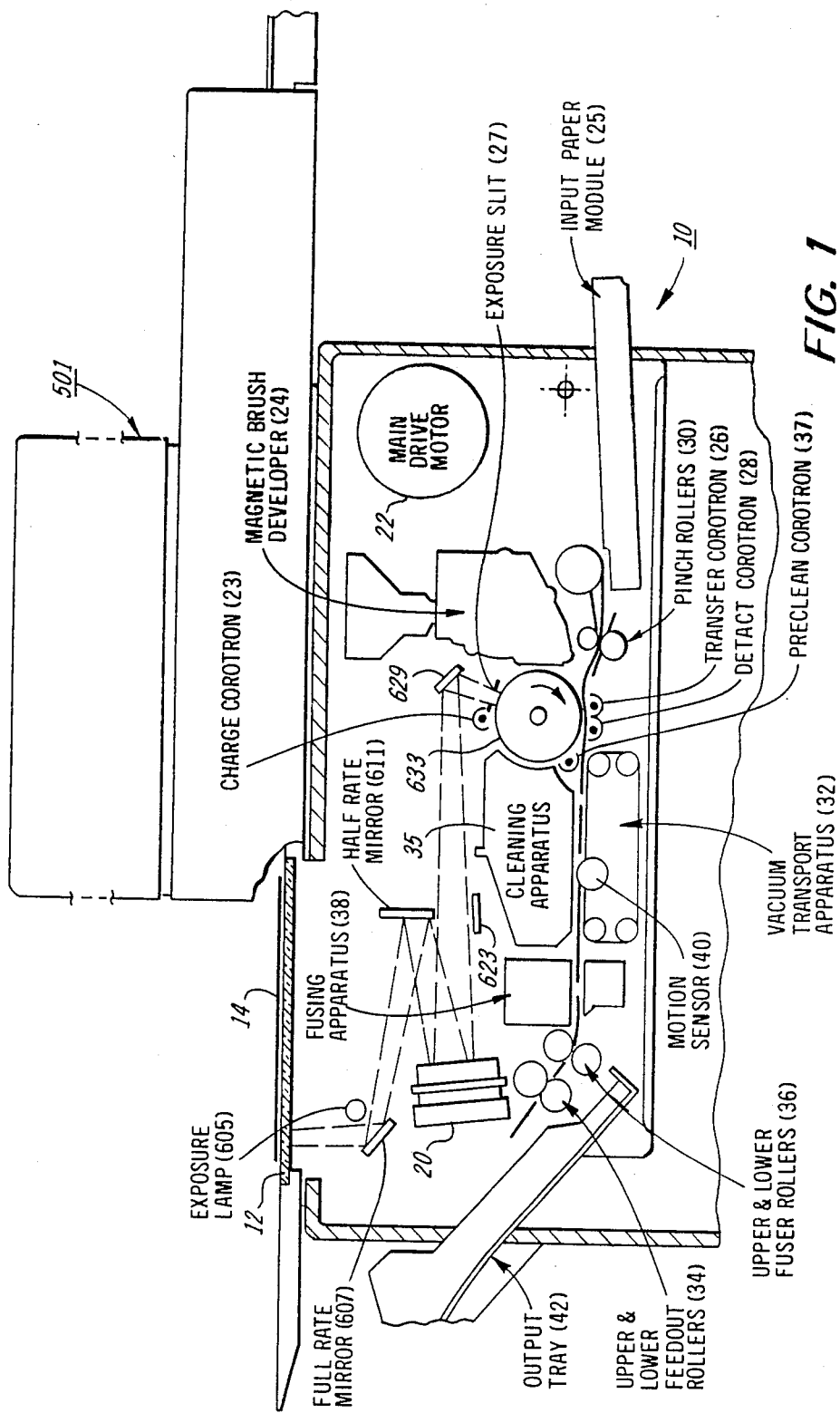
FIG. 1 is a side view of the office copier being utilized in the standard office copier mode.
Figure 2:
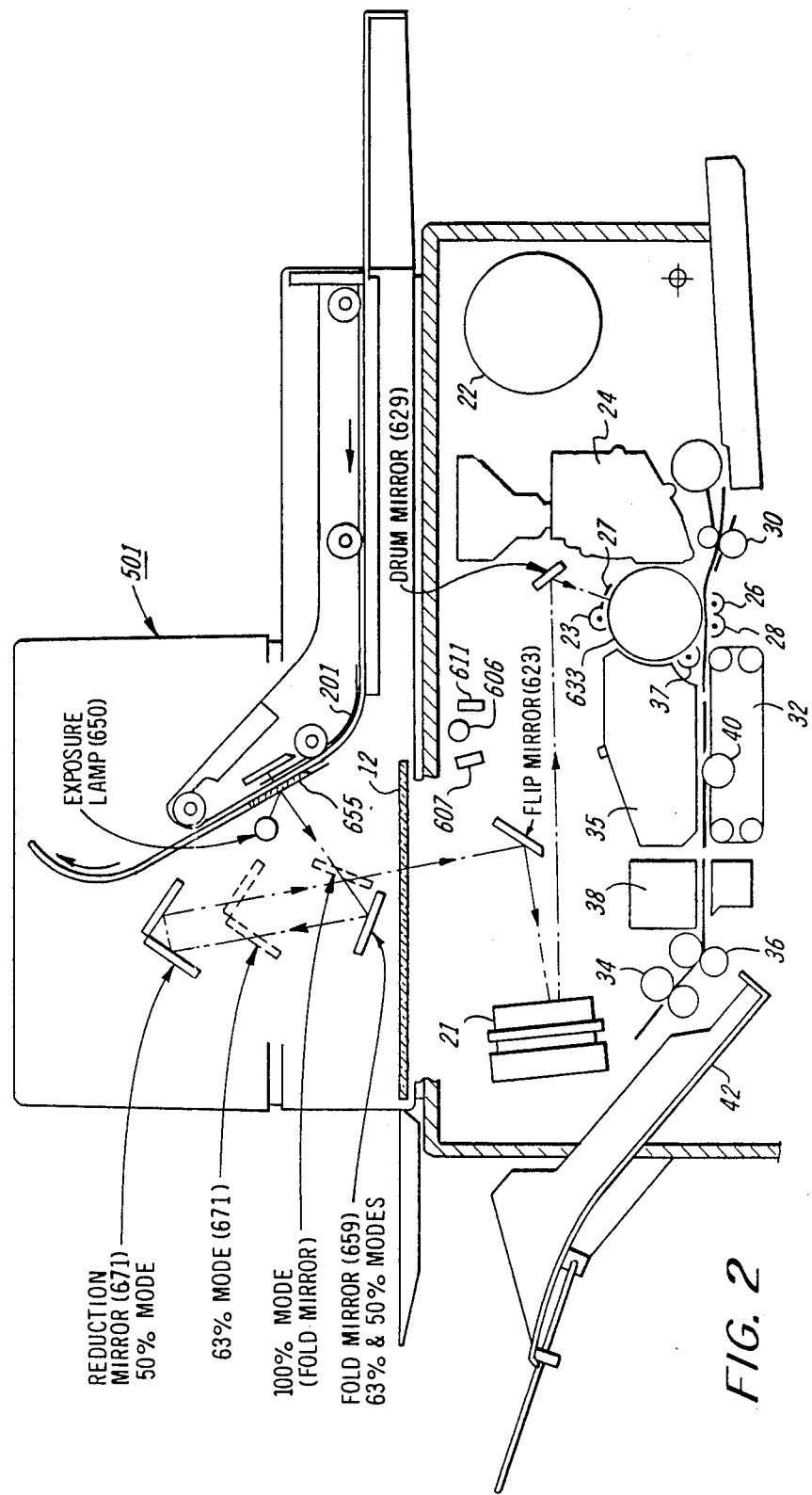
FIG. 2 is a side view of the same office copier as set forth in FIG. 1, now in the large document copying mode.

This invention presents a unique engineering print and general office copier. This office copier is the Xerox 2020 engineering print and general office copier manufactured and marketed by Xerox Corporation, Rochester, N.Y. The uniqueness of the 2020 is that the machine has two modes of operation, one from each of two operating stations. Referring now to FIG. 1, from the left side, an operator can make copies of documents up to letter or legal size originals. From the right side, an operator can make copies of engineering prints up to 24 inches wide by 36 inches long. Two reduction sizes, 63% and 50%, allow the operator to make copies on paper as large as 14 inches wide by 25 inches long. FIG. 1 shows the machine 10 in the platen mode (the document handler 501 is not over the platen 12). FIG. 2 shows the machine in the document handling (DH) mode. It is noticed that the document handling module 501 is capable of being in two different locations. In the platen mode, the document handler is stored away from the platen glass 12. In the document handling mode, the document handler 501 is positioned over the platen glass 12.

Each side has its own unique operator control panel, not shown, which allows the operator to perform all the control operations from that location. On the platen (left) side, the operator can program copy quantity from 1 to 99, for example. On the document handling (right) side, the operator can select full size or reduced size copies of 63% and 50%, respectively, for example. Each operator panel also contains a "this side on" button to position the document handler for use of that side under control of the electronics of the present invention. The "this side ready" lamps and the "other side ready" lamps, on each control panel, not shown, inform the operator of machine status.

The xerographic process is provided by the basic 3107 copier engine. Seen in FIG. 1, therefore, is a side view of the 3107 machine with the document handling module 501 in the platen mode, that is away from the platen 12 upon which a document to be copied is placed. Since the copier is really two machines combined into one, only some of the optical components are used at any one time. For example, when an operator is making copies from the platen glass 12, only the platen exposure lamp 605 and the mirrors below the platen glass 12 are used. When the operator is making copies from the document handler side in the document handling mode, the platen exposure lamp is turned off. Document illumination is provided by the document handler exposure lamp 650. In the document handler mode, the fold mirror 659 directs the document image to either the reduction mirror 671 or to the flip mirror 623 to be described later.

In the platen mode, the document 14 is stationary on the platen glass 12, and the lamp 605 and mirrors 607, 611 scan the document. In the document handler mode, the document 201 moves past the stationary document glass 655 and exposure lamp 650. A motor, not shown, in the optics cavity positions the lenses 20 and 21 for the selected magnification. The fold mirror 659 and the reduction mirror 671 in the document handler module 501 each have their own positioning motors, not shown.

Thus, in the standard copy mode, an operator would place the document 14 on the platen 12 and the start print cycle would be initiated. The exposure lamp 605 and full rate mirror 607 would scan the document with the light reflecting off the document onto the half rate mirror 611 which is moving along with the full rate mirror 607 but at half the speed. The flip mirror 623 which is used in the document handling mode is lying flat at this point and not in the path of light at this particular time. During a copy cycle, light from the exposure lamp 605, intensified by reflectors, not shown, illuminates the original document 12. The illuminated image is reflected down through the platen glass 12 to the full rate mirror 607 which is located on the full rate carriage, not shown. From the full rate mirror, the image is reflected to the half rate mirror 611 which is located on the half rate carriage, also not shown. Next, it is bounced into the lens assembly 20, strikes a mirror at the left end of the lens assembly, and goes back through the lens to the drum mirror 629. Finally, the image is reflected from the drum mirror to the xerographic drum 633. The exposure time, i.e., length of time that the light beam exposes the xerographic drum is controlled by the exposure slit 27 that is located a short distance above the drum. As the off-axis illumination of a lens is less than on-axis illumination, the exposure slit has a bow-tie shape for increased off-axis exposure time.

The operation of the full rate carriage, half rate carriage, and operation of the document imaging system, is well known in view of the wide use of the 3107 copier. However, a short description of the operation will be given for ease of illustration. After the print cycle has been initiated, with the main drive motor 22 running, mechanical drive is transmitted through the main drive chain to the various components within the system. This description follows later in conjunction with FIGS. 3a and 3b. Whenever the main drive motor is on, the drum or photoreceptor 633 rotates in a clockwise direction, as viewed from the front of the copier. When the charge corotron 23 is switched on, it applies an even positive electrostatic charge onto the drum surface. The drum 633 which was cleaned and discharged by the cleaning components, after the last transfer cycle, is now ready to receive an image from the optical system. In order to form a latent electrostatic image, the drum must be selectively discharged in accordance with the pattern of light and dark areas on the original document. This is done by exposing the clean, charged drum to the focused, timed document image produced as set forth above. As the image strikes the rotating drum, the light areas of the image discharge the drum surface. The dark areas of the image do not discharge the photoreceptor. The result of the exposure process is a latent electrostatic image, in which the dark areas remain charged, while the white areas are almost completely discharged. At this point, the image is not visible, i.e., it is only made up of static charges. In the development process, this image is made visible.

In the development process, the latent image on the drum comes into contact with the dry imager on the magnetic brush roller, not shown, in the magnetic brush developer 24. Dry imager is attracted from the brush onto the charged areas of the drum, producing a visible dry imager image on the drum. As the drum is turning and the imager is attracted to the charged areas of the drum, a sheet of paper from the input paper module 26 is being driven into the system in synchronism with the motion of the xerographic drum. Thus, in the image transfer process, a registered sheet of paper receives the dry imager image and an unfused copy is produced. The transfer 26 and detack 28 corotrons are on whenever the copier is in the printing cycle. As the pinch rollers 30 in the paper feeder drive the registered sheet of paper between the transfer corotron 26 and the drum 633, the corotron places an even charge on the paper. This charge causes the paper to adhere to the drum surface and attracts some of the dry imager onto it. As the paper continues to move to the left, it passes over the detack corotron 28 whose AC output neutralizes the charge on the sheet. This causes the unfused copy to detach itself from the drum so it can be driven onto the vacuum transport 32. The dry imager that was not attracted to the paper remains on the drum until it is removed by the cleaning system apparatus 35 and 37.

Photoreceptor cleaning has two major steps. First, the charge on the drum is neutralized by the corotron 37. Then the residual dry imager is scraped off the drum surface by the apparatus 35 and stored in the catch tray inside for disposal by a service representative later. When cleaning has been completed, the clean, discharged drum is ready for charging the next time a copy is made and the cycle begins again.

Whenever the main drive motor 22 is on, mechanical power is supplied to the paper path drive chain, which drives the pinch rollers 30, copy transport belts 32, and feedout rollers 34, 36. The pinch rollers 30 feed a sheet of paper to the drum 633 for image transfer, then drive the unfused copy onto the vacuum transport 32.

The transport belts 32 provide drive for the copy until the lead edge of the document passes through the fuser 38 and is taken by the feedout rollers 36. In order for the belts to reliably drive the copy, it must be held against them in some way. This is accomplished by means of a partial vacuum.

As a copy is transported from the drum to the fuser, its speed and time are monitored by the motion sensor 40. This monitoring is done to verify that a sheet of paper has been fed, that no paper is jammed, and that the copy speed is correct.

When the unfused copy passes through the fuser 38, the dry imager is melted into the paper. The fuser base, heated during standby, heats the back of the paper, but most of the heat comes from the front heater which heats the front of the copy as it passes through.

When the fused copy emerges from the fuser, it is transported to the receiving tray by two sets of rollers 34, 36. It is gripped first by the upper and lower fuser rollers 36, then by the upper and lower feedout rollers 34, and then deposited in the output tray 42. Drive for the feedout area comes from the paper path drive chain mentioned above and discussed below in conjunction with FIGS. 3a and 3b.

FIG. 2 shows a similar view of the dual mode copier with, however, the document handling module 501 now over the platen glass 12 in position to effect large document copying. In the document handler mode, the regular exposure lamp 605 and full rate 607 and half rate mirrors 611 are moved out of the way so that the document handling optics can be utilized. The document handler illuminating exposure lamp 650 functions in the same manner as the platen illuminator with the only difference relating to the physical location of the document handler illumination components. In the document handler, the components required to pass the light from a document to the xerographic apparatus include the reduction 671 and fold mirrors 659. These mirrors are used when making copies from the document handler 501. The fold mirror 659 directs the image from the document 201 to either the flip mirror 623 or the reduction mirrors 671. The fold mirror 659 is driven through a set of gears, FIG. 5a, mounted on the fold mirror pivot shaft apparatus. The reduction mirror is raised and lowered by a set of cables and pulleys connected between the motor and the reduction mirror assembly which can be seen more clearly in conjunction with FIG. 5b.

When the document handler 501 is in the platen position (that is, away from the platen glass 12), the logic in the copier electronics prevents the operator from changing magnification. However, when the document handler 501 is positioned over the platen glass 12, in the document handler mode, the operator can change the magnification. To change magnification, the operator would depress the proper image size button to change from 100% to 50% reduction, for example. If the operator presses that same button again, the lens will be driven to the 63% position. If the lens is in the 50% position and the operator wants to make 100% copies, the operator must press the correct image size button twice in succession. Lens position switches are actuated by proper cams on specific drive belts that connect the lens motor to the lens carriage, not shown for purposes of clarity in FIG. 2. The lens motor and the lens drive belt are connected by a drive shaft and a set of beveled gears.

Two lenses are used to achieve the size and reduction image outputs. In the 100% mode, the full size lens 20 is in use. The lens carriage, in the body of the machine, is driven in the direction perpendicular to the plane of FIG. 2 to position the lens on the machine center line. In the 63% mode the reduction lens 21 is in the optical path, and the lens carriage is driven to locate this lens on the machine center line. In the 50% mode, the reduction lens is positioned one inch from the machine center line. This results from a one inch decentration of the 12 inch wide output copy in a 14 inch output paper tray. To maintain equal exposure across the xerographic drum, the exposure slit 27 is also decentered one inch from the machine center line in the 50% mode.

For ease in description and understanding of the present invention, however, both the full size lens and the reduction lens are caled out in FIG. 2 as lens 21. The rest of the xerographic apparatus functions similarly to that in FIG. 1 so as to create the xerographic image of the document being fed into the document handler from the right hand side of FIG. 2.

Figure 3A:
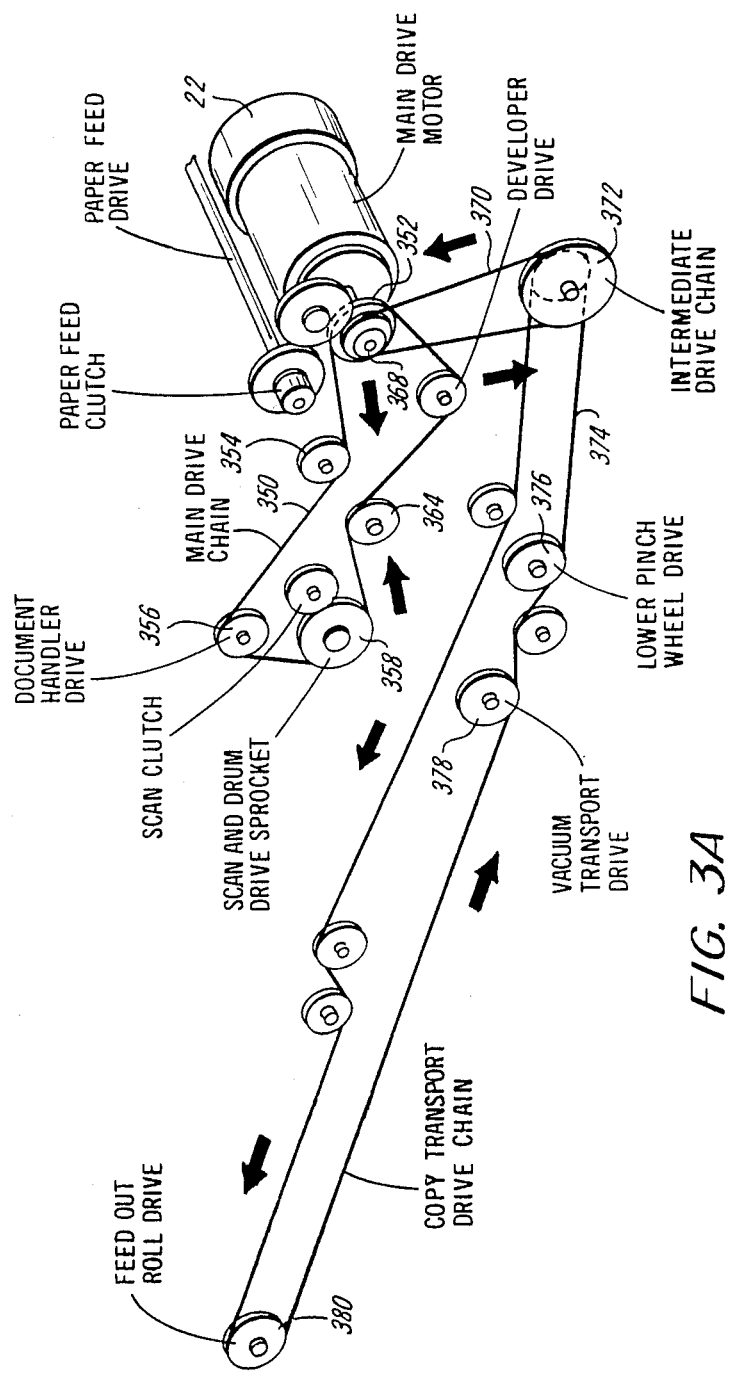
FIGS. 3a and 3b are schematic type diagrams showing the drive apparatus for providing mechanical drive to the various components of the dual mode copier of the present invention, from the main drive mode.
Figure 3B:
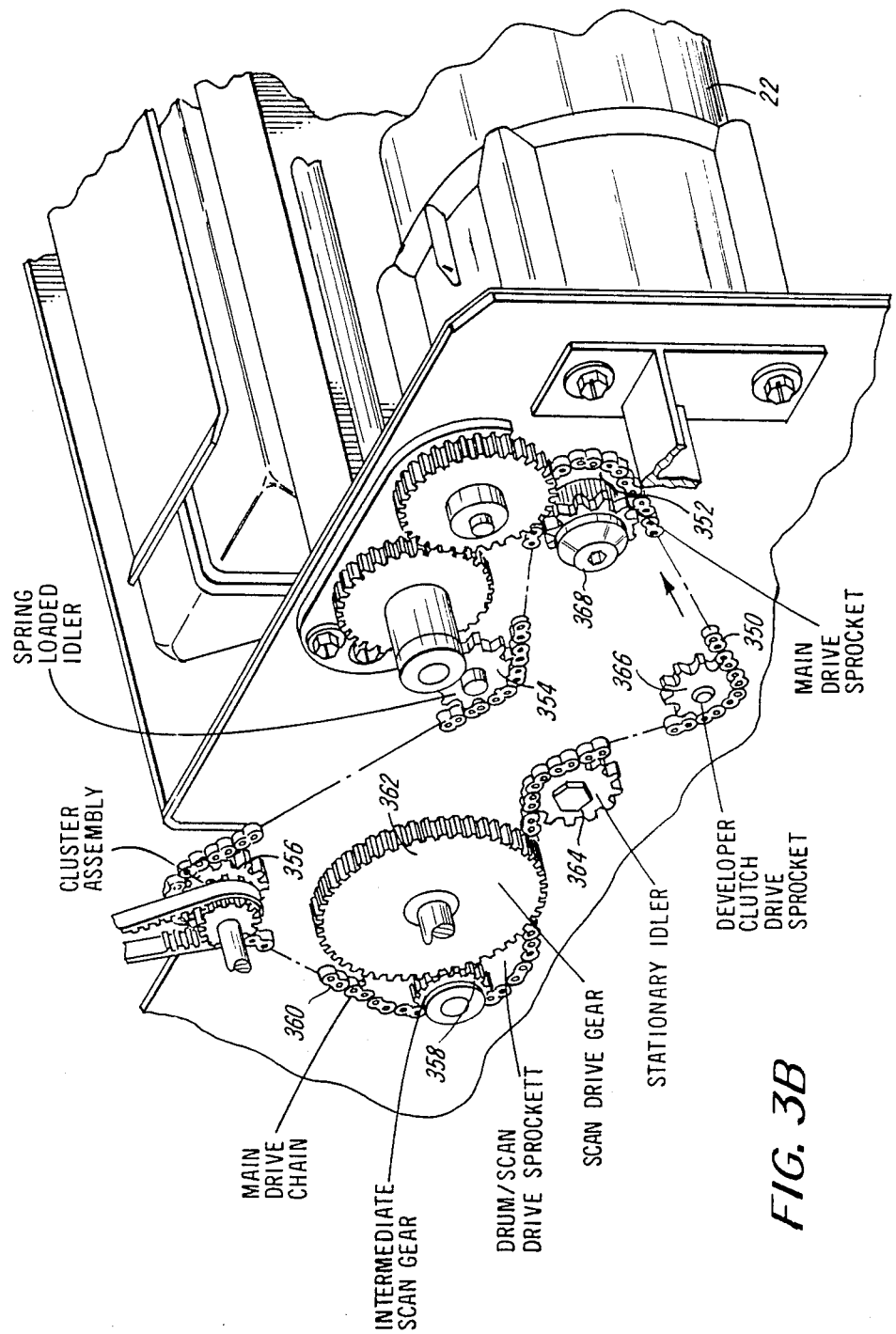

FIGS. 3a and 3b show the machine and main drive chains, respectively, which provide the main mechanical power to the dual mode copier in the present application. While the drive mechanisms form no major part of the present invention, a short description is included to show the method of providing some power from the main drive motor to the various operating parts of the machine.

When a print operation is initiated from either side of the machine, in either the copy or the document handling mode, power is applied to the main drive motor 22 seen in FIGS. 1 and 2 and more specifically in FIGS. 3a and 3b. FIG. 3b shows the path of the main drive chain 350. This chain transfers drive from the main drive sprocket 352 to other sprockets. Of these, two are idlers; the other three provide mechanical power to important machine functions. When the main drive motor 22 is on, the chain moves around the sprockets in a counterclockwise direction. This sends mechanical power to the document handler 501, drum 633, scan drive mirrors 607 and 611, and developer housing 24. The first sprocket the chain contacts is the spring loaded idler 354. Its function is to direct the chain toward the cluster assembly 356 and tighten it enough to prevent jumping, noise, and excessive wear.

Next, the chain turns the cluster assembly 356. This sprocket-pulley combination is on the optics shaft with the optics pulley, but it is isolated from the shaft by a bearing. Because of this, it does not make the optics shaft turn. The cluster assembly also provides drive for the document handler 501 seen in FIG. 2.

Then the chain loops around the drum/scan drive sprocket 358, which is connected by a short shaft to the drum drive gear behind the front frame and the intermediate scan gear 360. The drum drive gear meshes with the drum hub, causing the drum 633 to rotate and the cleaner mechanism 35 to operate. The intermediate scan gear 360 drives the scan drive gear 362; this makes mechanical power available to the scan drive components whenever the motor is on. However, the scan drive components only operate when the scan clutch is released.

Next, the chain passes over a stationary idler 364. Like the spring loaded idler 354, this sprocket is designed to direct the chain 350 and keep it tight on the sprockets it drives.

The last sprocket the chain drives is the developer clutch drive sprocket 366. This sprocket, which is connected to the developer clutch, makes mechanical power available to the developer housing 24. It drives the developer housing only when the developer clutch is energized by the electronics of the machine.

The intermediate drive sprocket 368 sends power through the intermediate chain 370 to the intermediate sprocket 372, seen in FIG. 3a. This sprocket provides drive for the lower pinch roller 30, copy transport 32, and feedout rollers 34, 36 by means of the copy transport drive chain 374. These areas receive mechanical drive whenever the main drive motor 22 is on. The copy transport drive chain 374 is driven through the intermediate chain 370 and sprocket 372 and the copy transportation drive sprockets whenever the main drive motor 22 is on. This chain drives the lower pinch roller sprocket 376, vacuum transport drive sprocket 378, and feedout rollers drive sprocket 380.

The lower pinch roller sprocket 376 supplies the drive to the pinch rollers 30, which drive the paper to the image transfer/copy detack point at the drum 633 and onto the vacuum transport 32. The function of the vacuum transport drive sprocket 378 is to supply drive to the vacuum transport belts 32. The transport belts feed the copy paper into the fuser assembly 38. After the fusing process, a copy is sent out to the receiving tray 42, seen in FIGS. 1 and 2 by the fuser 36 and feedout 34 rollers. The drive sprocket is attached to the lower fuser roller, and mechanical power is transmitted to the lower feedout roller via a timing belt. The upper two rollers are driven by friction when in contact with the lower rollers.

Figure 4A:
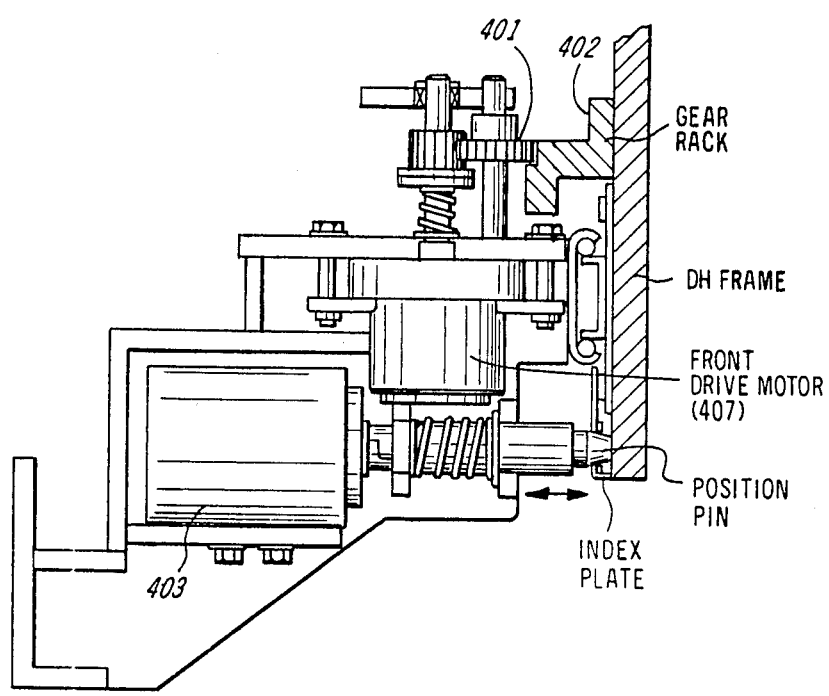
FIGS. 4a, 4b, and 4c show various mechanical drawings of the internal apparatus allowing the operation of the document handling module.
Figure 4B:
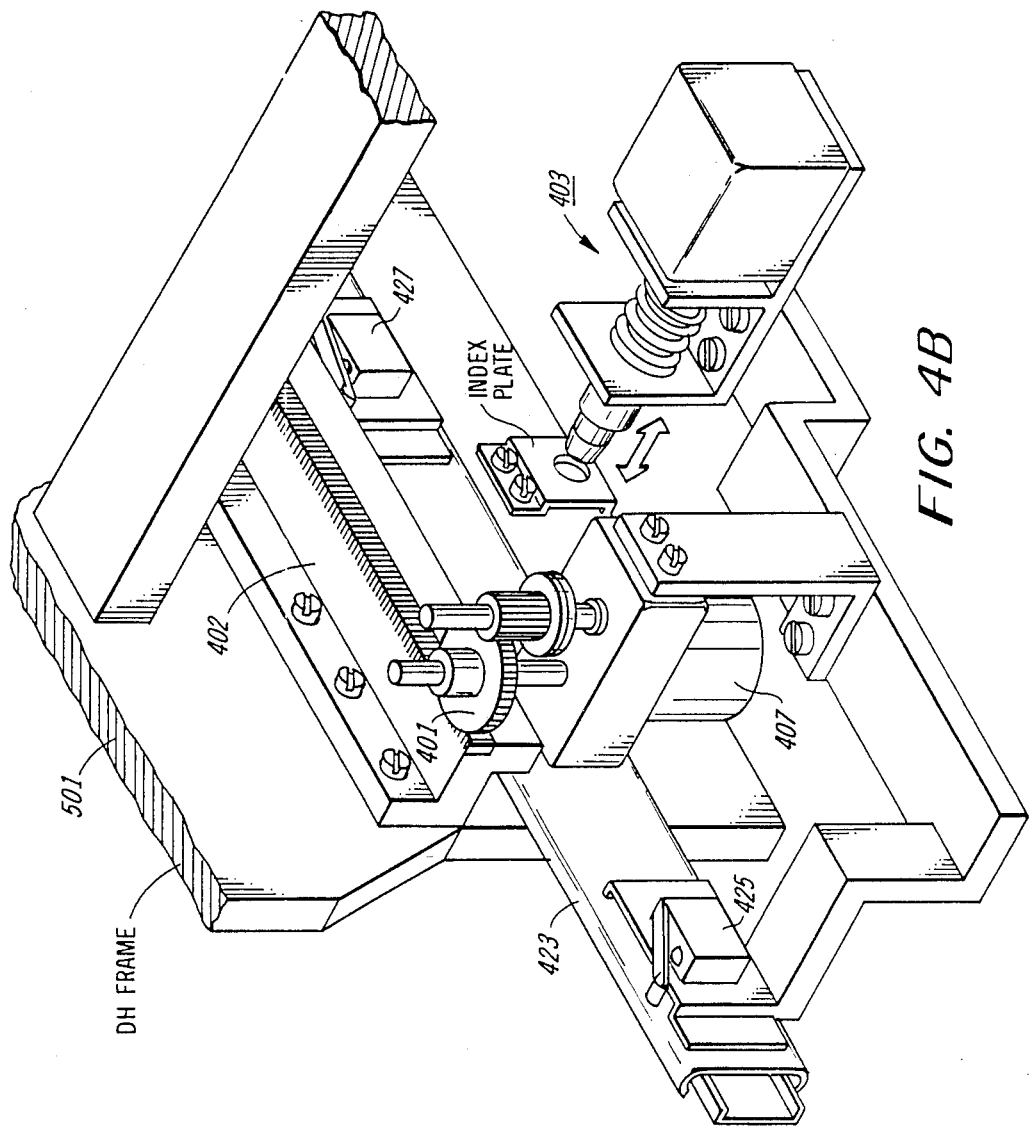
Figure 4C:
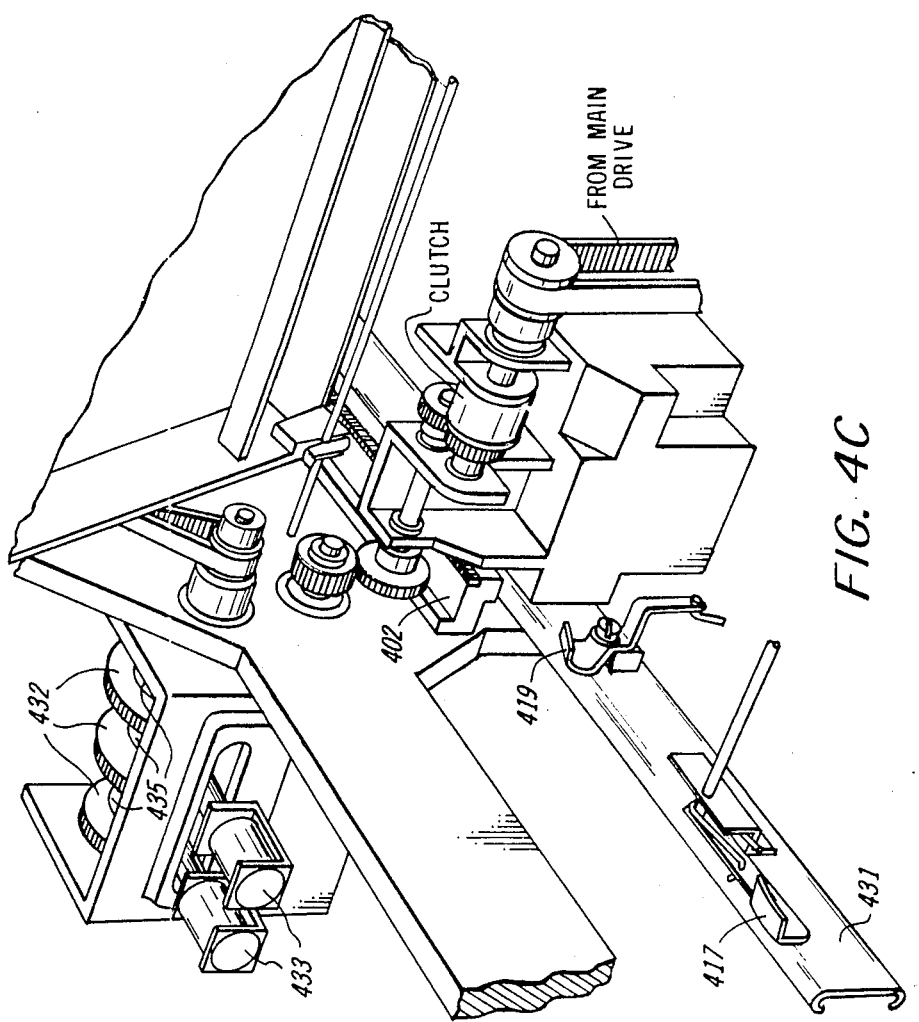

FIGS. 4a, 4b and 4c show the internal workings of the dual mode copier and specifically the operating devices which allow the document handler module 501 to move back and forth from the copy mode (left) to the document handling mode (right) and return. When an operator presses one of the "this side on" buttons, the circuitry in the document handler electronics energizes the document handler position solenoids, 403 to unlock the document handler 501. See FIGS. 4a and 4b which are views from the platen side of the machine. The circuitry also applies the proper voltage to the two document handler position drive motors 407 which rotate the drive gears 401 that engage the gear racks 402. During the transition from one position to the other position, the "please wait" lamps, not shown, are illuminated so the operator knows that everything is operating satisfactorily until the copy can be made.

With the document handler 501 in the platen position (not over the platen), the following sequence of events occurs when the operator presses the "this side on" button on the document handler control panel. The document handler drive motors 407 and solenoids 403 are turned on. The document handler 501 drives away from the document handler position to allow the solenoids 403 to pull out of the index plate. The motors 407 then reverse direction and drive toward the document handler position over the platen 12. At this time, while the document handler is moving toward the platen, the signal is sent to the copier carriages to remove them from the optical path from the document handler. The main drive motor 22 then begins to run. The scan carriage begins to move toward the end of scan as just indicated. The electronics check for the end of scan switch to be actuated and the electronics look for the document handler to actuate the document handler position switch seen in FIG. 4b. The logic then deenergizes the document handler position solenoids 403 the locking holes in the document handler frame. The document handler drive motors are then turned off and the operator is now told that a copy start sequence can be initiated.

The electronics in the dual mode copier provides that if the document handler 501 does not arrive at the new position within a predetermined amount of time, for example, 8.5 seconds, the logic in the electronics reverses the direction of the drive and returns the document handler 501 to the platen position, away from the document platen. This is accomplished by the DH position switch 425 detecting the document handling module 501 reaching its position in the DH mode; and for platen position switch 427 detecting the module 501 reaching its position in the copy mode. If any of the other elements fail to occur, the document handler also returns to the platen position.

Refer now to FIG. 4c, which is a view from the document handler side of the machine. When the document handler is driving from the platen position (off the platen) to the document handler position (over the platen), a ramp on the underside of the gear racks actuates three cams. The first cam 417 actuates the paper feed inhibit lever to prevent a sheet of paper from being fed into the xerographaic apparatus while the optics are driven to the end of scan position. The second cam 419 releases the flip mirror so that the document handler images can be reflected by the flip mirror to one of the lenses. The second cam 419 and its linkage also control the front gas spring latch hook to be described further later. The first and second set of cams are mounted on the front document handler slide 431. The third cam, mounted on the rear document handler slide 423, operates the latch mechanism for the rear gas spring. When the document handler is over the platen glass, two gas springs on the front and two on the rear of the copier are required to hold the copier open for servicing. When the document handler is in the platen position, only one spring in each location is required to hold the copier open while being serviced. With the document handler in the platen position, the latch hooks prevent the extra gas springs from extending. When the document handler 501 is over the platen glass 12, the proper "this side ready" lamps on the document handler control panel will be lit, and the "other side on" lamp on the platen control panel will be lit at this time.

At this time, the control panel indicates to an operator that the feeder is ready to accept originals. With the document handler positioned over the platen glass, in the document handler mode, the operator can make copies in three different magnifications: 100%, 63% and 50%. Magnification, perpendicular to document travel, is controlled by the positionsa of the lenses and the mirrors.

As the magnification is varied, the speed of the document travel must also be varied to prevent smearing of the images. The ratio of xerographic drum linear travel to document travel, must equal the magnification. As seen in FIG. 4c, the three document speeds are accomplished by three gear trains 432, three clutches 435 and two solenoids 433.

When in the 100% mode, the 100% gear train (right gear of FIG. 4c) is engaged through a one-way clutch. The other two gear tranis are disengaged by wrap clutches held stationary by the two solenoids.

When in the 63% mode, the right solenoid permits the 63% wrap clutch to rotate, thus engaging the center gear train. The 100% one-way clutch disengages the right gear train.

When in the 50% mode, the left solenoid permits the 50% wrap clutch to rotate, thus engaging the left gear train. The 100% one-way clutch disengages the right gear train.

The circuitry in the document handler electronics energizes the proper solenoid depending on the actuation of the proper image size switch. As set forth above, the main drive motor provides all the mechanical power to transport the document past the document handler platen glass. The drive rollers and belts drive the document from the feed-in shelf past the document glass and into the document receiving tray. The rollers in the upper and lower transports are positioned on their drive shafts so that at least two rollers on each drive shaft contact the document. To make copies, the operator must insert the document face down. The drive rollers then apply drive to the back of the document so that any slippage between the rollers and the document will not mark the face of the document. The idler rollers in the lower transport are individually adjustable to provide positive drive tension between the drive rollers and the document.

Figure 5A:
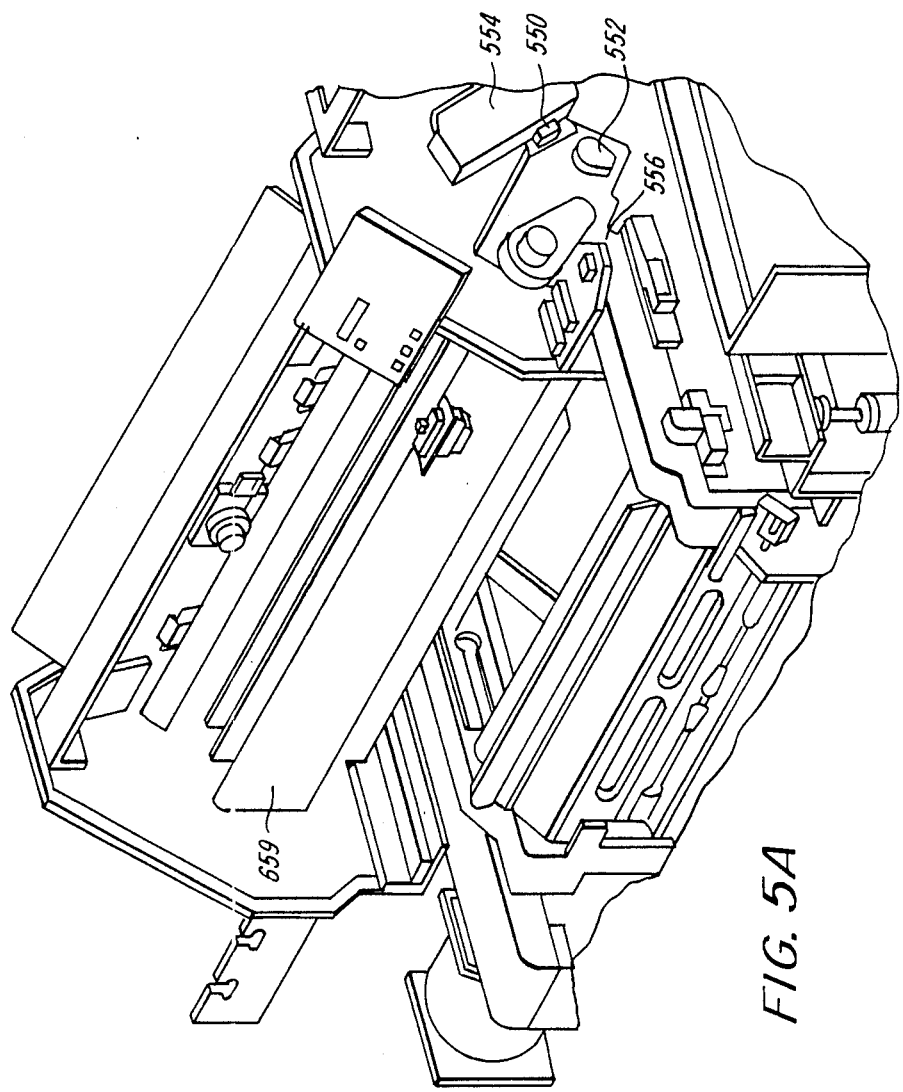

FIG. 5a shows the operation of the fold mirror 659. The operation would be as follows. The fold mirror 550 turns on, and the fold mirror 659 is lifted or lowered through the drive train. The motor also drives the actuator cam 552. The cam 552 actuates the reduction fold mirror switch 554 when the mirror is lowered. The cam actuates the 100% fold mirror switch 556 when the mirror is lifted.

FIG. 5b shows the operation of the reduction mirror 671. The reduction mirror motor 570 turns on and drives a system of cables 572 to raise or lower the reduction mirror 671. In the up position, the mirror actuates the 50% position mirror switch 514. In the down position, the mirror actuates the 63% mirror position switch 574. These position switches are utilized by the document handler electronics to determine that the mirror has reached the proper location.

Figure 6:
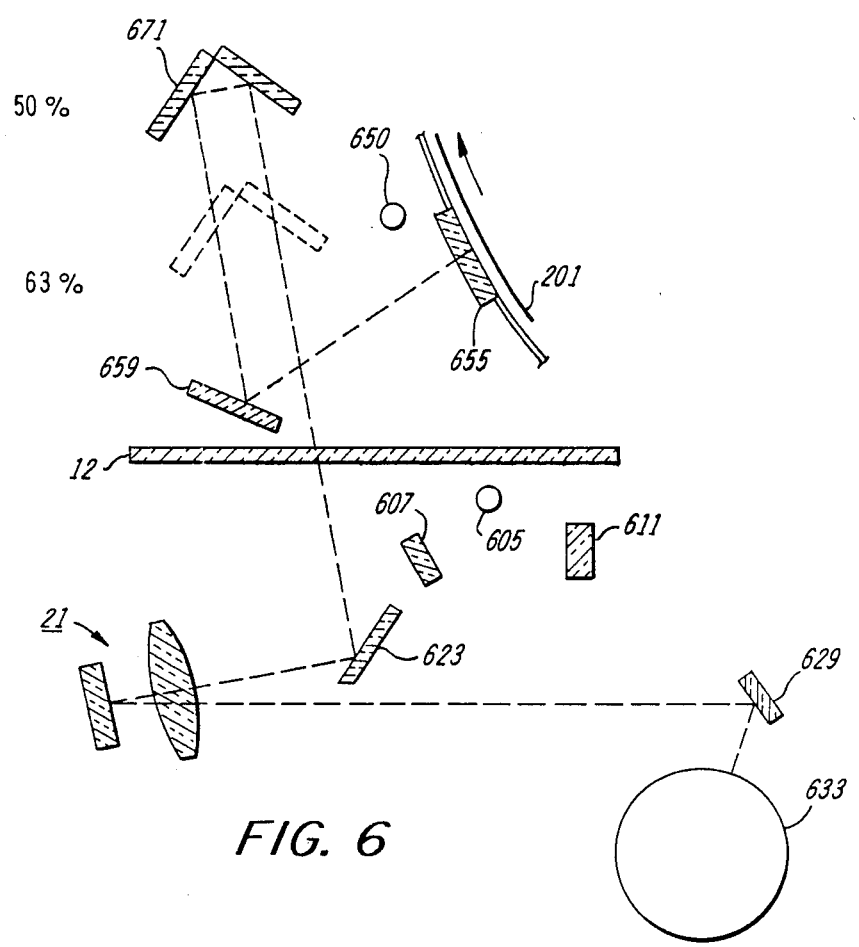
FIGS. 6a, 6b, and 6c are various schematic diagrams showing the specific operation of the various lenses to show the different modes of reduction of the documents.
Figure 6A:
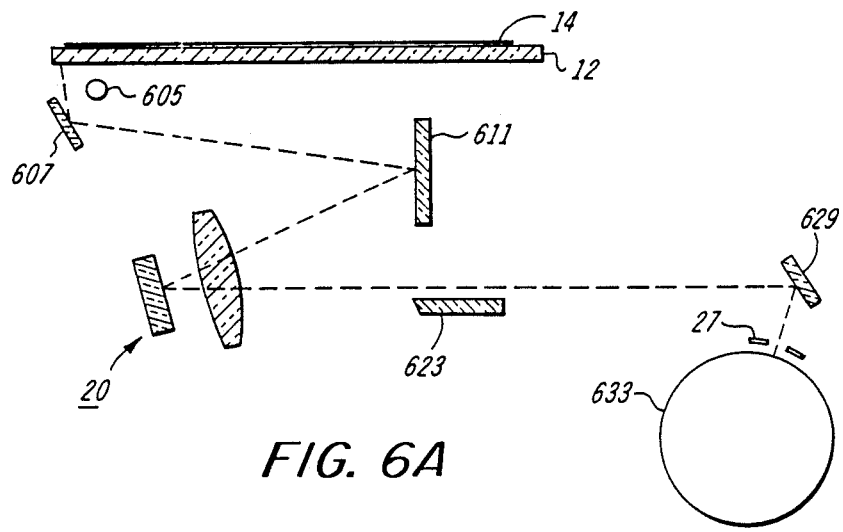

FIG. 6a shows the schematic diagram of the optical system when the dual mode copier is used in the copy mode. On the platen 12 is seen a document 14 which, in the copy mode, does not move. The full rate mirror 607 receives the light reflected off the document provided by the exposure lamp 605. The light from the full rate mirror 607 is reflected onto the half rate mirror 611. The full rate mirror 607 is moving to the right in the scanning mode at a first rate while the half rate mirror 611, because of the folded optics thereof, is moving to the right at half the rate of the full rate mirror. The light is then reflected by the half rate mirror onto the lens assembly 20 which reflects the light onto the drum mirror 629 and from the drum mirror through the exposure slit 27 to xerographic drum 633. In FIG. 6a can be seen the flip mirror 623 lying on the side out of the way, awaiting use in the document handling mode.

Figure 6B:
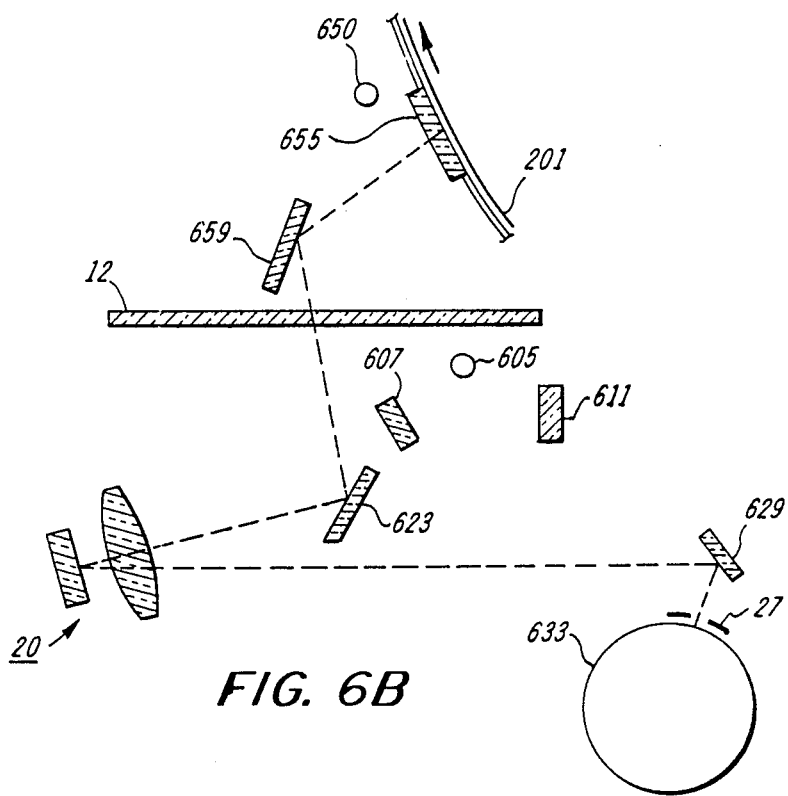

FIG. 6b shows a side view schematic diagram of the 100% copy mode when the document handler 501 is positioned over the platen. The document 201 would be fed up from the lower right to the upper left by the drive mechanism seen in FIG. 2 and provided by the mechanism in FIGS. 3a and 3b. The document handler exposure lamp 650 does not move in this instance, with the relative motion provided by the document 201 moving by the above set forth drive mechanism. The light is reflected from the document through the glass 655 onto the fold mirror 659 which is now set to reflect the light through the platen 12 onto the flip mirror 623 inside the body of the copier. The system now works similar to that in the copy mode wherein the light is reflected onto the lens assembly 20 which reflects the light onto the drum mirror 629 and onto the xerographic drum 633.

In FIG. 6c, however, the fold mirror 659 is now rotated about its axis so that the light from the document 201 can be reflected up toward the reduction mirror assembly 671. The dashed lines in FIG. 6c show the position of the reduction lens in the 63% mode while the full lines show the reduction lens in the 50% mode. The light is then reflected back towards the flip mirror 623 internally to the copier and reflected off of a reduction lens assembly 21 in order to provide the proper magnification and focal length for the reduction process. The light is then reflected from the reduction lens assembly to the drum mirror 629 and onto the xerographic drum 633.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A dual mode document copier comprising:
    a first operator station on one side of said copier for presenting to the copier normal and smaller size documents to be copied in a first mode,
    a second operator station on the other side of said copier for presenting to the copier normal and larger size documents to be copied in a second mode,
    a document handling module being positioned on said one side of said copier away from said first area when said normal and smaller size documents are to be copied and being positioned on said other side of the copier over said first area when normal and larger size documents are to be copied.

2. The dual mode copier as set forth in claim 1, further including:
    a document platen at said first area upon which are placed said normal and smaller documents to be copied in said first mode, said copier including exposure lamp means and optical means beneath said platen for exposing the documents in said first mode for detection of information on said documents for subsequent development and creation of copies of said documents.

3. The dual mode copier as set forth in claim 2 further including drive means for driving said document handling module from its non-operating position on said one side of said copier in said first mode to its operating position on the other side of said copier over said platen in said second mode, and return, upon selective input command.

4. The dual mode copier as set forth in claim 3 wherein said document handling module comprises:

input paper drive means for receiving and advancing an input document to be copied, exposure lamp means for exposing said input document being advanced past said lamp, optic means for receiving the light from said document and introducing said received light through said platen when the document handling module is over said platen in the secend mode.

5. A dual mode document copier comprising:

a first operator area for presenting to the copier normal and smaller size documents to be copied in a first mode, a second operator area for presenting to the copier normal and larger size documents to be copied in a second mode, a document handling module being positioned on one side of said copier away from said first area when normal and smaller size documents are to be copied and being positioned on the other side of the copier over said first area when normal and larger size documents are to be copied, a document platen at said first area upon which are placed said normal and smaller documents to be copied in said first mode, said copier including exposure lamp means and optical means beneath said platen for exposing the documents in said first mode for detection of information on said documents for subsequent development and creation of copies of said documents, drive means for driving said document handling module from its non-operating position on said one side of said copier in said first mode to its operating position on the other side of said copier over said platen in its second mode, and return, upon selective input command, and rail means upon which said document handling module rides and for providing a path of movement of said module from one side of the copier to the other, and return, said drive means providing the drive source for moving the document handling module along its path of movement.

6. The dual mode copier as set forth in claim 5 further including:

a first position detection means at one end of said rail means for detecting when and if the document handling module has reached the first position in said first mode of operation, and a second position detection means at the other end of said rail means for detecting when and if the document handling module has reached the second position in said second mode of operation, said copier being inactivated if said first or second position detection means are not activated within a predetermined period of time during the transition period between the selection of said first and second modes.

7. The dual mode copier as set forth in claim 6 further including:

a first position solenoid means for locking and unlocking said document handling module at its first position on said rail means, and a second position solenoid means for locking and unlocking said document handling module at its second operating position on said rail means.

8. the dual mode copier as set forth in claim 7, wherein said drive means comprises drive motor means and drive gear means for coupling said document handling module to said rail means, said drive motor means, upon selective input command, driving said document handling module in its last direction to free the first or second position solenoid means to allow the withdrawal of hte actuated solenoid means, said drive motor means then reversing the direction of its driven motion to move the document handling module to the other operating position.

9. A dual mode document copier comprising:

a first operator area for presenting to the copier normal and smaller size documents to be copied in a first mode, a second operator area for presenting to the copier normal and larger size documents to be copied in a second mode, a document handling module being positioned on one side of said copier away from said first area when normal and smaller size documents are to be copied and being positioned on the other side of the copier over said first area when normal and larger size documents are to be copied, a document platen at said first area upon which are placed said normal and smaller documents to be copied in said first mode, said copier including exposure lamp means and optical means beneath said platen for exposing the documents in said first mode for detection of informtion on said documents for subsequent development and creation of copies of said documents, drive means for driving said document handling module from its non-operating position on said one side of said copier in said first mode to its operating position on the other side of said copier over said platen in its second mode, and return, upon selective input command, said document handling means comprising:

input paper drive means for receiving and advancing an input document to be copied, exposure lamp means for exposing said input document being advanced past said lamp, optic means for receiving the light from said document and introducing said received light through said platen when the document handling module is over said platen in a second mode, said document handling module optic means comprising:

fold mirror means in a first position for directing the light received from said document down through said document platen, flip mirror means in a first, operating, position below said document platen for receiving th light reflected by said fold mirror means, said flip mirror means further reflecting said received light to the copier optics for further processing and development.

10. The dual mode copier as set forth in claim 9 further including means for folding said fold mirror means into a second position for directing the light received from said document in a direction away from said document platen, reduction mirror means in the path of light received from said fold mirror means when said fold mirror means is in said second position, said reduction mirror means directing said reflected light back through said document platen to said flip mirror means, said reduction mirror means providing predetermined amounts of optical reduction of the document being scanned depending on the distance away from said fold mirror means.

11. The dual mode copier as set forth in claim 10 further including means for moving said lens means to and from said flip mirror and for moving said reduction mirror means to and from said fold mirror means along its reflective path to provide predetermined rates of optical reduction for the scanned document.

12. The dual mode copier as set forth in claim 11 further including means for moving said lens means in a lateral direction to center the image formed by said lens on various copy formats.

13. The dual mode copier as set forth in claim 12 further including means for moving the exposure slit in a lateral direction to center the slit on the axis of said lens.

* * * * *